United States Patent [19]
Fletcher et al.

[11] 4,044,753
[45] Aug. 30, 1977

[54] SOLAR ENERGY COLLECTION SYSTEM

[76] Inventors: James C. Fletcher, Administrator of the National Aeronautics and Space Administration, with respect to an invention of; M. Kudret Selcuk, La Canada, Calif.

[21] Appl. No.: 681,096

[22] Filed: Apr. 28, 1976

[51] Int. Cl.² .................................................. F24J 3/02
[52] U.S. Cl. .................................... 126/271; 126/270; 60/641; 52/117
[58] Field of Search ............... 126/270, 271; 237/1 A; 353/3; 60/641; 52/116, 117, 643, 146, 120, 648, 111; 212/58 A, 47

[56] References Cited
U.S. PATENT DOCUMENTS

| | | | |
|---|---|---|---|
| 761,596 | 5/1904 | Moss | 126/271 |
| 811,274 | 1/1906 | Carter | 126/271 |
| 1,969,839 | 8/1934 | Goddard | 126/271 |
| 2,307,737 | 1/1943 | Courtney | 212/47 |
| 2,322,150 | 6/1943 | Lewis | 52/117 |
| 2,412,678 | 12/1946 | Goldman | 52/116 X |
| 3,466,119 | 9/1969 | Francia | 126/270 X |
| 3,713,727 | 1/1973 | Markosian et al. | 126/271 |
| 3,892,433 | 7/1975 | Blake | 126/270 X |
| 3,924,604 | 12/1975 | Anderson | 126/270 |
| 3,979,597 | 9/1976 | Ducker | 126/270 X |

*Primary Examiner*—Kenneth W. Sprague
*Assistant Examiner*—Larry Jones
*Attorney, Agent, or Firm*—Monte F. Mott; Wilfred Grifka; John R. Manning

[57] ABSTRACT

A solar energy collection system including a plurality of energy receivers supported in suspension by an array of radially extending booms above a field of heliostats which serves to reflect a plurality of beams of solar energy toward said receivers. Each of said receivers is characterized by a curved target surface substantially totally illuminated by the reflected beam. A network of interconnected conduits for conducting a working fluid along a tortuous path in juxtaposition with the target surface of each receiver, whereby the working fluid is heated for converting radiant energy to heat, and a network of conduits for collecting and conducting heated working fluid away from the receivers.

8 Claims, 10 Drawing Figures

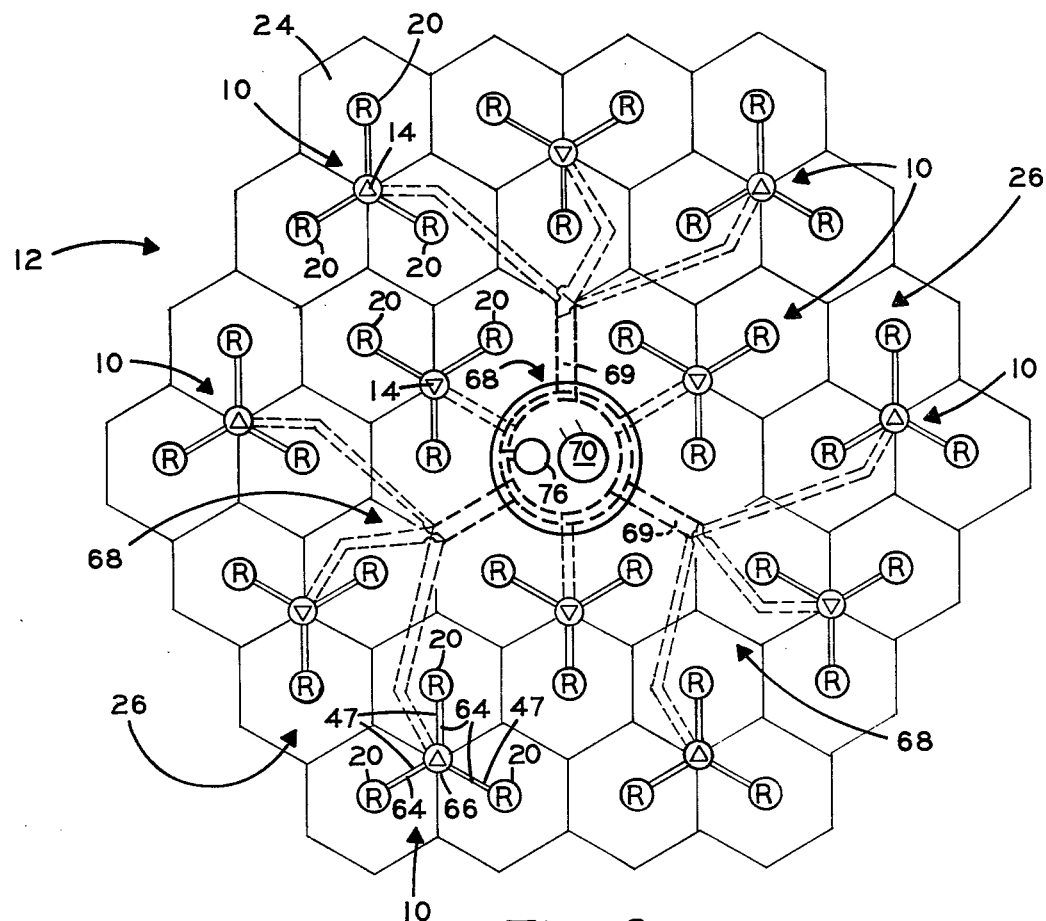
Fig. 2
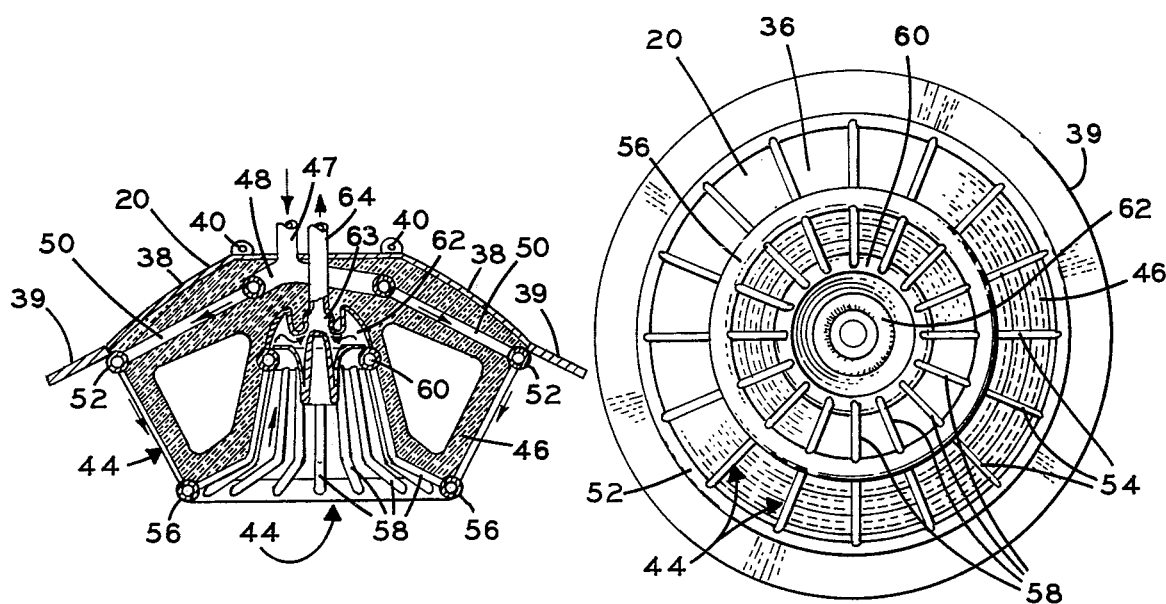
Fig. 4
Fig. 5

SOLAR ENERGY COLLECTION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to solar energy conversion systems and more particularly to a collection system particularly suited for use in collecting solar energy and converting the collected energy to other forms of usable energy such as thermal, electrical and the like.

The sun, of course, comprises a substantially nondestructive source of energy available for continuous exploitation. It has long been recognized that radiant solar energy can and should be utilized to a greater extent in order to reduce dependence upon fossil fuels as sources of usable energy.

Unfortunately, those systems heretofore employed in collecting and utilizing solar energy generally lack efficiency of an order of magnitude necessary for effectively competing with fossil fuels. Efforts to provide new systems, as well as to improve existing systems and techniques are continuously being made at all levels in attempting to acquire and utilize energy derived from solar sources at reduced costs. The likelihood of success of the efforts now being made depends largely upon the cost effectiveness of the systems when employed in collecting and converting solar energy to usable forms of energy.

2. Description of the Prior Art

One direction taken in attempting to enhance cost-effectiveness encompasses a use of a field of heliostats comprising a plurality of reflective surfaces, each having a capability for concentrating a beam of solar energy on a collector equipped with an energy conversion unit adapted to collect and convert radiant solar energy to usable forms of energy such as electrical and thermal forms. Those engaged in the search for systems and techniques capable of collecting and converting solar energy at reduced costs can readily appreciate that the prior art contains numerous descriptions of systems which employ reflector and receiver combinations through which radiant solar energy is concentrated and converted to a more usable form of energy, such as electrical or thermal energy.

The prior art energy collection systems are characterized by centralized energy receivers which capture concentrated beams of radiant energy directed toward the receivers by solar energy reflectors. One such system utilizes energy receivers supported on a tower above an array of energy reflectors, such as a heliostat field. Unfortunately, a significant loss of ground area attends the use of such a system. As can be appreciated the loss is occasioned by the space occupied by the base for the tower, as well as by the space normally occupied by the heliostat field utilized for reflecting incident beams of radiant solar energy toward the receivers.

Where reflectors are mounted near the base of a tower, the attendant loss of area, of course, is minimal. However, such arrangements generally provide for poor intercept angles, particularly where the receivers are mounted atop supporting towers for intercepting beams reflected from surfaces near the base of the tower. Although beams reflected from the edges of a heliostat field are characterized by good angles of incidence, relative to the receivers, dispersion of the beams due to pointing errors tend to dilute solar flux. Consequently, a major portion of the flux field established by reflected beams may be lost because of poor interception. This, of course, can be overcome, generally, by increasing the relative size of the target area of the receiver. However, an increase in the size of the target area tends to increase construction and maintenance costs disproportionately to the increases realized in the level of the system's efficiency. Moreover, precise uniformity in flux distribution normally is not obtainable. Hence, because of a lack of uniformity in flux distribution an increase in temperature differentials occurring across the system is experienced with an attendant reduction in overall efficiency.

Another parameter which must be considered by designers of solar energy collection systems is wind-loading. In those geographical areas in which solar energy collection systems are used with greatest effectiveness, a greater average wind-loading of supporting towers can be expected. Unfortunately, the towers heretofore proposed generally are characterized by a low strength-to-cost ratio. The criticality of this parameter can be more fully appreciated when it is recognized that a failure of a single tower not only removes the energy collection system from an on-line status, but inherently requires extensive repair at an inordinate expense.

Finally, energy collection systems which employ tower-mounted receivers supported above a heliostat field generally lack a capability for expansion, without redundant add-on facilities. Of course, redundant add-on facilities necessitate excessive expenditures of capital.

It should, therefore, be apparent that there currently exists a need for a simple efficient system through which solar energy can be collected and converted to a usable form and utilized more effectively, efficiently, and economically.

It is, therefore, the general purpose of the instant invention to provide an improved energy collection system particularly suited for use in collecting energy from solar sources, characterized by a simple, economic, and efficient combination of improved receivers, supported by an improved array of radially oriented booms above an improved field of heliostats, whereby the efficiency and cost effectiveness of radiant energy collection systems generally are enhanced.

OBJECTS AND SUMMARY OF THE INVENTION

It is, therefore, an object of the instant invention to provide an improved solar energy collection system.

It is another object to provide an improved solar energy collection system having enhanced energy collection and conversion capabilities.

Another object is to provide an energy collection system particularly suited for use in collecting solar energy at reduced costs and increased efficiency.

It is another object to provide an energy collection system characterized by a magnitude of efficiency suitable for effectively competing with systems employed in collecting and converting energy extracted from fossil fuels and the like.

Another object is to provide an improved solar energy collection system characterized by a plurality of receivers suspended above a heliostat field comprising a multiplicity of reflector surfaces, each being adapted to direct a concentrated beam of solar energy to illuminate a target surface for a given receiver.

It is another object to provide in an energy collection system particularly suited for use in collecting solar energy a receiver having a curved target surface for accepting beams of solar energy at a wide range of angles of incidence.

It is another object to provide in a solar energy collection system a receiver having a target surface characterized by a substantially oblate hemispheric configuration, and an energy conversion unit including a plurality of concentrically related conduits of substantially annular configurations and a plurality of substantially radially extended conduits interconnecting the concentrically related conduits for conducting a working fluid in its liquid phase along a tortuous path for absorbing heat from an incident beam of solar energy.

Another object is to provide an energy collection system which is particularly useful in connection with the conversion of radiant solar energy to heat, although not necessarily restricted in use thereto since the energy collection system of the instant invention is similarly useful when employed for converting solar energy to other forms of energy, such as electrical energy.

These and other objects and advantages are achieved through the use of a solar energy collection system characterized by a reflective field of heliostats for simultaneously reflecting a plurality of beams of radiant solar energy, a plurality of energy receivers, each having a target surface of a substantially oblate hemispheric configuration, a network of interconnected conduits for conducting a working fluid along a tortuous path in juxtaposition with the target surface, whereby the working fluid is heated by the radiant solar energy for thus converting radiant energy to heat, an array of radially extended booms supporting said plurality of energy receivers in suspension above the field, and a network of delivery conduits for conducting the heated working fluid away from said receivers to a point of use, as will become more readily apparent by reference to the following description and claims in light of the accompanying drawings.

BRIEF DESCRIPTION OF THE DRAWINGS

FIG. 2 is a schematic view of the system shown in FIG. 1.

FIG. 4 is a cross-sectional view of one of the receivers shown in FIG. 1.

FIG. 5 is a bottom plan view of one of the receivers.

DESCRIPTION OF THE PREFERRED EMBODIMENT

Figure 1:
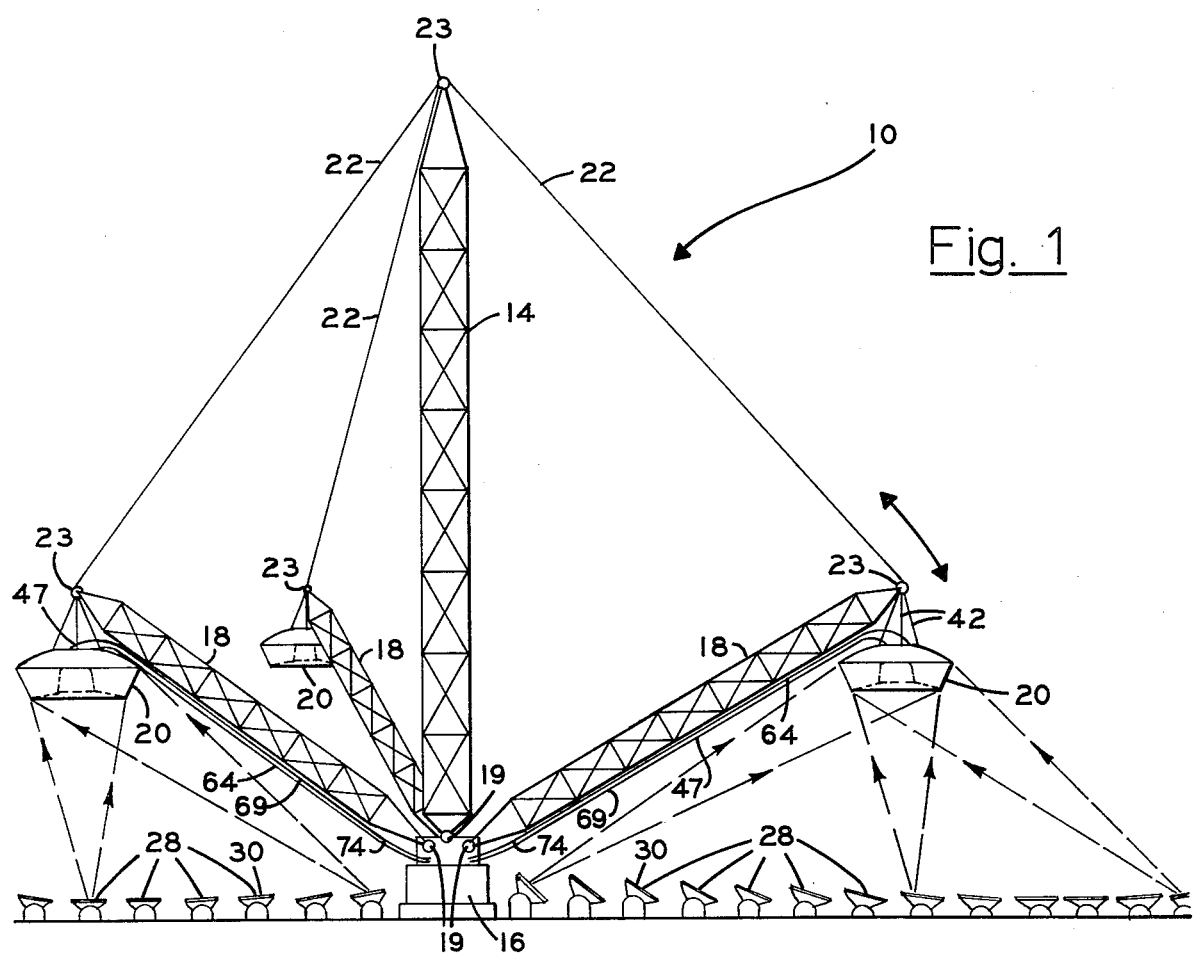
FIG. 1 is an elevational view of a solar energy collection system embodying the principles of the instant invention, including a plurality of receivers suspended from the distal ends of an array of inclined booms above a field of individual heliostats comprising a plurality of reflector surfaces.

Referring now to the drawings with more particularity wherein like reference characters designate like or corresponding parts throughout the several views, there is shown in FIG. 1 a sub-section 10 of a system 12, FIG. 2, which embodies the principles of the instant invention.

As depicted in FIG. 2, the system 12 includes a rather large number of sub-sections 10. As shown in FIG. 1, each subsection 10 includes a pylon 14 supported on a rigid base 16. From the base there also is radially extended a plurality of inclined booms 18. Where desired, the pylon and booms are connected to the base 16 by suitable pins 19. Each of the booms then supports at its distal end a receiver 20. Cables 22 are extended between the distal ends of the booms 18 and the uppermost end of the pylon 14 so that the booms, in effect, counterbalance the pylon. It will, therefore, be appreciated that the cables 22, in effect, form a flexible supporting network which serves to support the pylon 14 and the booms 18 in a static condition, with the pylon 14 being vertically oriented and the booms 18 being extended radially in an inclined relationship with respect to the pylon 14.

Turning to FIG. 2, it can be seen that each of the receivers 20 is substantially coaxially aligned with a field 24 of a plurality of heliostats which collectively form a curved reflecting surface, generally designated 26, which reflects a concentrated beam of solar energy. It should, therefore, be apparent that the length of the booms 18 and their angle of inclination are such as to accommodate a positioning of the receivers 20 above the reflecting surface 26 at proper elevations for receiving a concentrated beam of solar energy. It should, also, be noted that each field 24 is of a hexagonal configuration for thus accommodating a maximization of the utilization of surface area.

Figure 3:
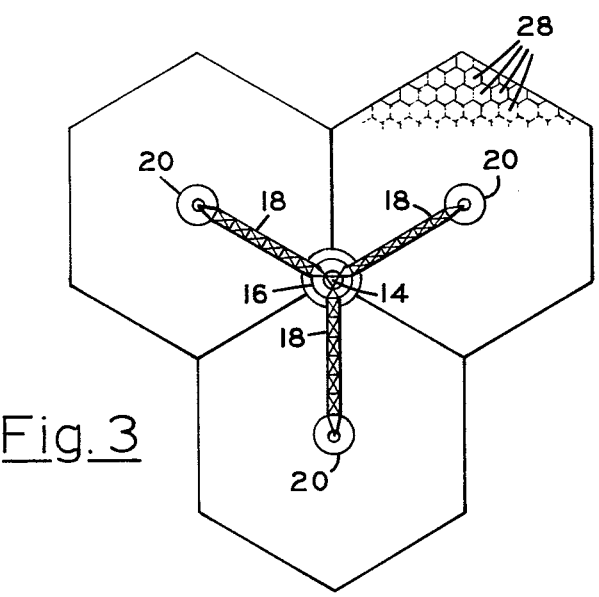
FIG. 3 is a top plan view, on a reduced scale, of the system shown in FIG. 1.
Figure 7:
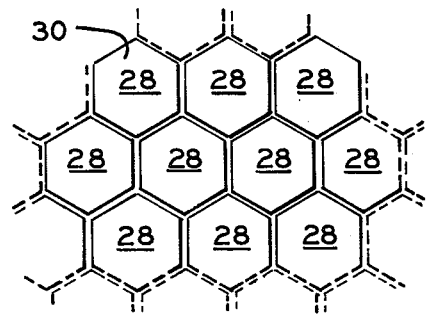
FIG. 7 is a top plan view of a segment of the field of heliostats shown in FIG. 1 depicting a preferred nesting arrangement for the individual heliostats.
Figure 9:
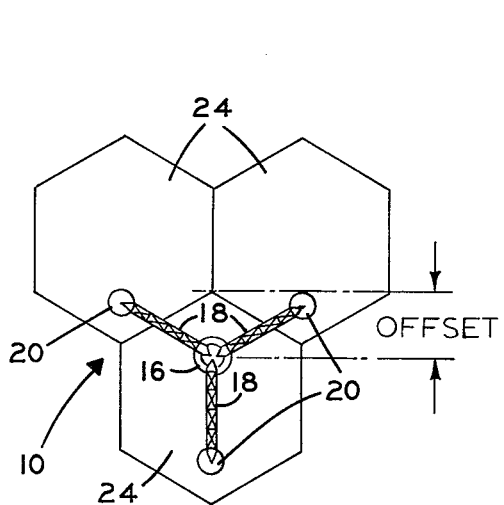
FIG. 9 is a schematic view illustrating an alternate arrangement of receivers and reflectors which may be employed for accommodating changes in the declination of the sun.

As shown in FIGS. 2 and 3, the pylons 14 are concentrically related to the array of reflectors for each sub-section 10. Of course, the position of the pylon 14 may be varied, as schematically illustrated in FIG. 9, in order to accommodate solar conditions at different geographical locations and at different seasons. However, the following description of the invention is provided with the assumption that the pylon 14 is oriented in a zone concentrically related to a triangular array of fields 24, as illustrated in FIGS. 1, 2 and 3.

Figure 6:
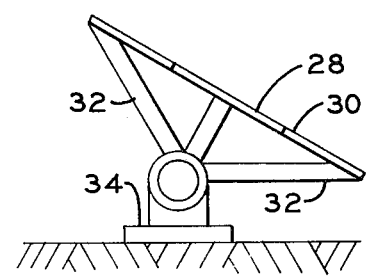
FIG. 6 is a side elevational view of a single heliostat included within the field shown in FIG. 1.

Each of the fields 24 comprises a field of individual heliostats 28. Each of the heliostats 28 includes a reflecting surface, also of a substantially hexagonal configuration. Thus the density of the heliostats 28 within each field 24 is enhanced because of the innate nesting characteristics of bodies of this configuration. Since the design and function of a heliostat are well known, a detailed description of the heliostats 28 is omitted in the interest of brevity. However, it is to be understood that each of the heliostats includes a reflecting surface 30 supported by a suitable frame 32, FIG. 6, mounted for angular adjustment about a pivotal axis passing through a base 34.

As depicted in FIG. 1, for illustrative purposes only, the surfaces 30 of the heliostats 28 are angularly related in a manner such that the surface 30 collectively define a concave surface having a focal point in the vicinity of the receiver 20 suspended thereabove. Thus each of the fields 24 serves to direct a narrowing or conical beam toward a receiver 20. Thus a concentrated beam of solar energy is directed toward the receiver.

Figure 10:
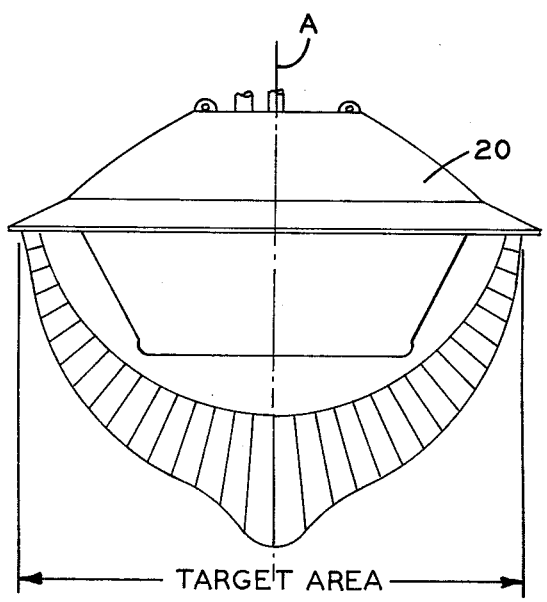
FIG. 10 is a schematic view depicting a flux distribution pattern for an incident beam of solar energy as it strikes the target surface of one of the receivers.

Each of the receivers 20 includes a target surface, designated 36. The surface 36 is of curved configuration for accepting a beam of reflected solar energy at a wide range of angles of incidence. It is important that it be appreciated that the target surface 36 for each receiver 20 is so configured as to accommodate a complete illumination by a beam directed thereto by the field 24. As shown in FIG. 5, each target surface is of a substantially oblate hemispheric configuration. As a beam of reflected solar energy strikes the target surface a flux pattern is established having a greater density near the vertical axis for the receiver, designated A, as best illustrated in FIG. 10.

Each of the receivers 20 includes a suitable cover shell, designated 38, formed of a suitable material and being of a generally concave configuration. A plurality of eyes 40, FIG. 4, is provided for receiving cables 42, FIG. 1. These cables serve to connect the receivers in suspension to the elevated ends of the booms 18. Of course, the particular manner in which the receivers 20 are connected to the booms 18 is varied as desired. However, it should be apparent that the receivers preferably are supported in a manner such that the axes A remain coincident with the axis of the fields 24 above which the receivers are supported.

As a practical matter, each target surface is defined, at least in part, by the external surfaces of a plurality of closely spaced, interconnecting conduits which form a network 44 through which a working fluid, such as water, is continuously circulated. A suitable lightweight insulating material 46 is provided to lend structural support to the network of conduits while the network is connected to a suitable feed line 47. As best shown in FIG. 4, each network 44 includes an intake manifold 48 of a substantially annular configuration connected to a feed line 47. From the intake manifold there is radially extended a plurality of conduits 50. These conduits intersect at their distal ends with a header 52. The header 52 also is of an annular configuration and is concentrically related to the receiver 20. From the header 52 there is extended a plurality of closely spaced preheater tubes 54, FIG. 5, which intersect with a header 56, also of an annular configuration. From the header 56 there is extended a plurality of evaporator tubes 58 which intersect an annular header 60 for a header chamber 62 within which the working fluid is vaporized. Each header chamber 62 communicates through a header 63 with a discharge line 64 which serves to convey the working fluid in its vapor state from the receiver 20.

Figure 8:
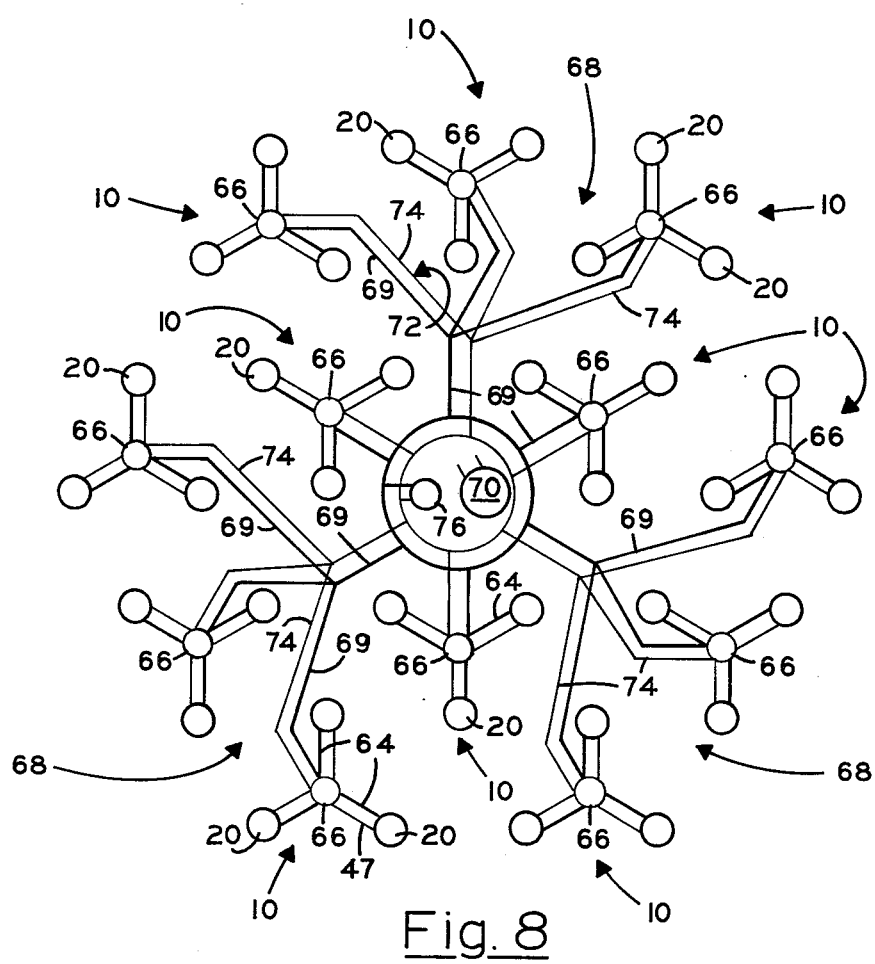
FIG. 8 is a schematic view illustrating a system of conduits for delivering a working fluid to and from the plurality of receivers.

As best illustrated in FIG. 2, the discharge lines 64 for each sub-section 10 intersect at a collection header 66. Each of the collection headers 66 is connected in a collection network, generally designated 68, including delivery conduits 69, which serve to connect the collection header 66 with a consumer, generally designated 70. The consumer 70 preferably is oriented in a centralized relationship with the system 12. While the consumer 70 forms no specific part of the instant invention, it is to be understood that where so desired the consumer 70 includes structure suitable for converting heat to other forms of energy, such as electrical energy and the like. Moreover, while the consumer 70 is illustrated as being centrally oriented with respect to the system 12, the consumer 70 can be located in any suitable relationship with the system. It is to be understood that the feed lines 47 are connected with a suitable source of working fluid, such as water in its liquid phase, located in a suitable relationship with the system 12. As illustrated in FIG. 8, the working fluid is delivered to the receivers 20 via a distribution network, generally designated 72, including a plurality of interconnected conduits 74, paralleling the conduits 69, and a pump 76. As a practical matter, the conduits 69 and 74 are encased in a suitable insulating sheath not shown.

OPERATION

It is believed that in view of the foregoing description, the operation of the device will readily be understood and it will be briefly reviewed at this point.

The system 12, as shown in FIGS. 2 and 8, is assembled in the manner and employing the structure hereinbefore described. With the individual heliostats 28 of the fields 24 suitably positioned for directing concentrated beams of reflected sunlight toward the receivers 20, suspended thereabove by the booms 18, the system is thus prepared for operation. The pump 76 is energized for purpose of delivering a working fluid, such as water, through the network 72 for forcing the working fluid, simultaneously, through the feed lines 47 into the intake manifolds 48. The liquid is then distributed through the conduits 50 to the header 52. With the beams of reflected sunlight illuminating substantially all of the target surface of each of the reflectors, the working fluid is preheated as it exits the header 52 via the preheater tubes 54. The fluid is then received in the header 56 and subsequently directed along a plurality of converging paths defined by the evaporator tubes 58 as the solar energy elevates the temperature of the working fluid. As the working fluid exits the evaporator tubes 58, it is received by the header 60 and delivered thence to the header chamber 62. As the working fluid enters the header chamber 62, it enters a zone in which the density of the solar flux is greatest, as indicated in FIG. 10. The energy of the reflected beam now further elevates the working fluid to convert the working fluid to vapor. The vaporized working fluid now exits the header chamber 62 via the header 63 and is conveyed from the receiver 20 to a collection header 66, via the network 68 of vapor discharge lines 64. From the collection header 66 the vaporized working fluid is delivered via a vapor delivery conduit 69 to the consumer 70 and there employed in a suitable manner which forms no specific part of the instant invention.

In view of the foregoing, it should readily be apparent that the system which embodies the principles of the instant invention provides a practical solution to the perplexing problem of effectively, efficiently, and economically converting solar energy to more readily usable forms.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An energy collection system particularly suited for use in collecting energy from a solar source including:
   A. at least one heliostat having a reflecting surface for reflecting an incident beam of radiant solar energy; and
   B. an energy receiver for absorbing heat from an incident beam of radiant solar energy reflected by said surface including means for converting solar energy to heat, comprising a plurality of concentrically related annular conduits and a plurality of substantially linear conduits interconnecting said annular conduits forming a network of a substantially aspherical configuration for conducting a working fluid in its liquid phase along a tortuous path.

2. The receiver of claim 1 wherein said heliostat comprises one of a plurality of heliostats, said plurality of heliostats including reflecting surfaces collectively establishing a surface for reflecting a converging beam, and said receiver is configured to accept a converging beam of concentrated solar energy at a wide range of angles of incidence.

3. An energy collection system particularly suited for use in collecting energy from a solar source including:
   A. a triangular array of contiguous heliostat fields, each field comprising a plurality of contiguously related heliostats of a hexagonal configuration collectively forming a surface for reflecting a conical beam of solar energy;
   B. a triangular array of mutually spaced energy receivers, each receiver being supported in suspension above a heliostat field of the triangular array of heliostat fields for receiving a conical beam of energy reflected by one of the array of fields; and
   C. means disposed within each of said receivers for converting radiant energy to heat comprising a network of tubular conduits for conducting a working fluid along a tortuous path for absorbing heat from a conical beam of reflected energy.

4. The system of claim 3 further comprising means including a collection header commonly connected to the tubular conduits of the energy receivers for collecting heated working fluid, and means connected to said network of tubular conduits for delivering a working fluid thereto.

5. The system of claim 3 further comprising a radiating array of inclined booms, each having a base end and a distal end, means commonly connected to the base ends of the booms for supporting the booms in anchored relation with said system, and means for singularly connecting the receivers of said array of receivers in suspension from the distal ends of the booms of said array of booms.

6. A solar energy receiver for converting radiant solar energy to heat including:
   A. a cover shell of a downwardly opening concave configuration;
   B. an energy conversion unit suspended beneath said shell comprising a plurality of concentrically related conduits of substantially annular configurations, and a plurality of radially extended conduits interconnecting said concentrically related conduits for conducting a working fluid in its liquid phase along a tortuous path for absorbing heat from an incident beam of radiant solar energy;
   C. a delivery tube connected with said energy conversion unit for delivering a working fluid thereto;
   D. a header chamber concentrically related to said plurality of concentrically related conduits for converting the working fluid to a vapor as heat is absorbed from said beam; and
   E. means including a vapor conduit connected to said header chamber extended away from said receiver for conducting said working fluid in its vapor state away from the header chamber.

7. The receiver of claim 6 wherein the surface of the conduits defines a target surface substantially simultaneously illuminated by said incident beam.

8. The receiver of claim 7 wherein said target surface is of a substantially oblated hemispherical configuration.